United States Patent

[11] 3,614,737

[72] Inventor Charles Sadowsky
Great Neck, N.Y.
[21] Appl. No. 855,955
[22] Filed Sept. 8, 1969
[45] Patented Oct. 19, 1971
[73] Assignee Dactylog, Inc.
New York, N.Y.

[54] METHOD AND APPARATUS FOR INDIVIDUAL RECOGNITION
10 Claims, 5 Drawing Figs.

[52] U.S. Cl. .......... 340/146.3 E
[51] Int. Cl. .......... G06k 9/04
[50] Field of Search .......... 340/146.3, 149 A; 356/71; 350/71; 197/101; 132/73; 84/319

[56] References Cited

UNITED STATES PATENTS 3,292,149 12/1966 Bourne .......... 340/146.3 UX
3,516,059 6/1970 Hindman et al. .......... 340/146.3
2,393,371 1/1946 Harris .......... 132/73
2,580,739 1/1952 Delno et al. .......... 132/73

*Primary Examiner*—Daryl W. Cook
*Assistant Examiner*—William W. Cochran
*Attorney*—Curtis, Morris & Safford

ABSTRACT: A method and apparatus for determining or verifying the identity of an individual wherein characteristics of a designated skin area of the individual, for example on the hand, are transduced into electrical signals which are then matched to or compared with a corresponding set of stored electrical signals representative of the characteristics of the same designated skin area of an individual whose identity is known. The characteristics of the designated skin area are scanned along a linear path by a light source and photoelectric cell and the light and dark representations of the ridges and depressions and/or the variation in contrast of the designated skin area are transduced by a transducer into electrical signal representations which representations are then compared by a comparator circuit in a computer with the allegedly corresponding representations stored in a computer memory bank. If the two sets of representations correlate, the identity of the individual is determined.

INVENTOR
CHARLES SADOWSKY
BY
Curtis, Morris & Safford
ATTORNEYS

INVENTOR
CHARLES SADOWSKY
BY
Curtis, Morris & Safford
ATTORNEYS

INVENTOR
CHARLES SADOWSKI
BY
Curtis, Morris & Safford
ATTORNEYS

METHOD AND APPARATUS FOR INDIVIDUAL RECOGNITION

This invention relates to a method and apparatus for transducing an individual's skin ridge and depression pattern into electrical signals and comparing these transduced signals with a set of stored signals known to belong to that individual for automatic recognition purposes.

Because of a growing need for an accurate, reliable and rapid system for positive individual recognition and also for a system for verification of an individual's identification for commercial or security purposes, there has been an increased effort to develop systems which may be utilized to provide a fast and accurate means for positive identification or verification of the identity of an individual. The standard method for positive identification of an individual has been, for many years, the matching of "fingerprints." This has become, because of the great mass of files, an extremely tedious and time consuming task. In the field of identity verification, although a number of systems have been developed for verification of an individual's identification, for example identification cards with signatures and the like, such systems suffer from the inherent defect that identification cards may be switched or duplicated and signatures may be forged.

It has long been recognized that one practically fool-proof means for positive identification of any individual is by means of skin representations such as fingerprints, footprints, handprints and the like, as the human skin contains numerous ridges or elevations and furrows or depressions arranged in various patterns or forms. These patterns have various physiological uses and purposes but, sociologically, one of the most important uses of the patterns of these ridges and depressions in the skin configuration is for positive identification purposes.

Ridge patterns of the human skin area may be reproduced in a known pattern by inkprints. Such prints of the fingers are commonly termed "fingerprints." These fingerprints have long been accepted to be a positive method of identification because no two individuals have the same pattern of fingerprints. It has also been determined that not only are the prints taken from an individual's finger tips different from individual to individual but also the characteristics of the skin found along the length of the fingers, the palm and also the back of the hand, with the back of the fingers providing an especially good identification base.

Because fingerprints and the characteristics of any designated skin area of an individual enable positive identification of individuals to be made and, because such positive identification means cannot be destroyed and is always on the individual, these characteristics furnish an excellent means of identification. The ridge and depression patterns on such skin areas are present at birth and last even after death until destruction or decomposition so that this system of identification remains without a doubt the best and most proved method of positive identification of individuals.

Although fingerprint detection is highly developed and is widely used in police work, it has not obtained widespread usage in other fields because fingerprint comparison, filing and recognition are manual and visual processes requiring specially trained experts. In addition, because there are now so many fingerprint files to be compared, it is often many days before a positive identification can be made. Thus, it would be highly desirable to be able to automatically accomplish individual identification by comparison of the characteristics of a designated skin area of an individual for commercial endeavors, such as credit protection and identification, insurance identification and protection, verification of an individual's identity for security uses as well as in criminal detection operations.

Systems devices have heretofore been developed to transduce the ridges and depressions of a particular skin configuration into electrical information which can be fed to a data processing system and there compared with stored data to determine whether the electrical information fed into the system corresponds with a known pattern stored in the data processing system. Certain of these devices rely upon the principle that a single line or trace, or a predetermined pattern or trace, across a finger print contains sufficient information, when transduced into electric information, to distinguish between different fingerprints.

A critical factor in order to assure fingerprint comparison by tracing a single line or pattern across the fingerprint or other skin configuration of an individual, is that there must be means for insuring that the same line or pattern will be retraced on the fingerprint or skin configuration each time it is presented for identification and recognition and that the signals generated from this will compare with a signal from storage representing a line or pattern across the same skin area of the allegedly same individual being identified. Also, to automatically complete the identification, the system must be capable of transducing a particular individual's fingerprint into electrical representations and compare these representations with stored representations of the individual being identified. Because pluralitive signals representing individual fingerprints of many people are stored, means for synchronizing the extraction of the particular stored fingerprint with a signal developed by a fingerprint transducer also must be provided.

As far as is known, however, there is no commercially successful automatic means for recognition of fingerprints or the characteristics of any other designated skin area. This is because, heretofore, adequate commercially feasible means have not been available to align a skin area in a fixed given position relative to the transducer means to assure that the same line on the skin area will be retraced each time an identification is required and compared each time with the stored representation of this same line of the person being identified.

In the prior devices developed for positive identification of an individual by transducing fingerprint or skin configuration patterns, various methods have been devised to repeatedly align a particular skin area with respect to the transducer. One such method disclosed in U.S. Pat. No. 3,231,861 is an optical system wherein an individual to be identified positions his finger by aligning an image of it with a fixed position image of a print of this finger which is imprinted on an identification card or the like carried by the individual. The individual then superimposes his finger upon the image of the fingerprint which is optically reproduced from the identification card to obtain a proper alignment. This method is not entirely satisfactory, nor is it commercially practical because it is a tedious process to align an individual's finger to an image of the same and, hence, requires an inordinate delay for positive identification. In addition, as bogus identification cards may be made it would be relatively easy to prepare a fraudulent card so that the system would not detect the fraud. Also, an individual presenting himself for credit in a mercantile situation, if such a a system were used in a credit verification system, would not wish to be subjected to a chore of this nature. In addition, since it is necessary to transduce the impressions into electrical signals which are sent to a data processing system where the comparison is made, delays in achieving proper alignment to obtain positive identification would require longer use of the data processing system and, hence, would be exceedingly costly. Thus, use of a system such as this for commercial endeavors, where volume demand for positive identification is expected, would prove to be too costly to use.

Another method which has been proposed, see U.S. Pat. No. 3,292,149, is to position the finger of an individual to be identified electronically by moving a transducer relative to the finger to take scans from various points, or centers, and then, using a trial and error method, find the correct line or pattern, if it is present. This method also is not practical because too much time, i.e., computer time, is required to make the repeated scans until the correct line or pattern is found. Thus, this method is also too costly for commercial endeavors because of the cost for use of the necessary data processing systems.

Various positioning devices also have been devised to position a finger or other suitable skin area but these have not proven capable of repeatedly positioning the finger in the same position relative to a transducer as is required for automatic positive identification systems of the character described.

Furthermore, the commercialization of an automatic positive identification system has been uneconomical because, heretofore, only the ridges and valleys of the tips of the finger and their swirl patterns have been thought to be of sufficient detail to be useful for positive identification. Accordingly, only fingerprints have been examined and used as a benchmark for positive identification. Because fingerprints comprise countless variations of swirl patterns, the equipment necessary to transduce and compare the ridges and valleys in these myriad patterns as are found on the fingertips is of a very exacting nature, and, hence, very expensive to manufacture and maintain. Additionally, because the scan of swirl patterns such as are found on fingertips is of such a complex nature, any inaccuracy in transducing the electrical signal or misalignment of the finger increase the time necessary for the comparison. Hence, the computer time needed is increased thus greatly increasing the expense of making a positive identification.

Accordingly, it is a primary object of the present invention to provide a commercially feasible method and apparatus for establishing an individual's identity by automatic recognition of the characteristics of a particular skin area.

Another object of the present invention is to provide an apparatus for establishing an individual's identity including a skin area positioner to position a designated skin area relative to a transducer to allow the ridges and valleys in a single line across the designated skin area to be transduced into electrical information with the single line being the same line represented by stored information of the characteristics of the designated skin area.

Yet another object of the present invention is to provide a method for establishing an individual's identity by taking a linear scan along a designated skin area and transducing the characteristics of the individual's skin thus scanned into electrical signals which may be correlated and compared to a set of stored known characteristics thereby to establish and/or verify the individual's identity.

Still another object of the present invention is to accomplish the above with equipment which is relatively inexpensive to construct and maintain and which will operate in an accurate and economical manner.

The above and other objects are accomplished in accordance with the teachings of the present invention by the provision, in one preferred embodiment, of a hand support or positioner, for use in cooperation with a transducer to convert suitable distinguishing features of a designated skin area into electrical signals which can be correlated and compared by data processing equipment which may be either a digital and/or an analog computer with stored signals representative of a known individual in order to verify the identity of, or positively identify, an individual.

The positioner orients a designated portion of the hand of an individual so that the skin area to be transduced is repeatedly oriented in the same fixed position relative to the transducer. Thus, the same designated area can be repeatedly transduced and correlation and comparison with stored representations of the designated skin area can be made rapidly with a high degree of accuracy. The positioner has a flat support surface upon which an individual places his hand palm down with the fingers spread. The surface supports the hand and cooperates with the spread fingers to fix the rotational position of the hand with respect to the transducer. Because the entire hand is placed on the support surface with the fingers spread, any tendency to rotate the hand, and consequently, the designated skin area, is minimized. A positioning guide is also provided to orient the hand on the surface so as to bring the designated skin area into proper alignment with the transducer means.

These and other objects and advantages of the invention will be more readily apparent from consideration of the following description and accompanying drawings.

Figure 1:
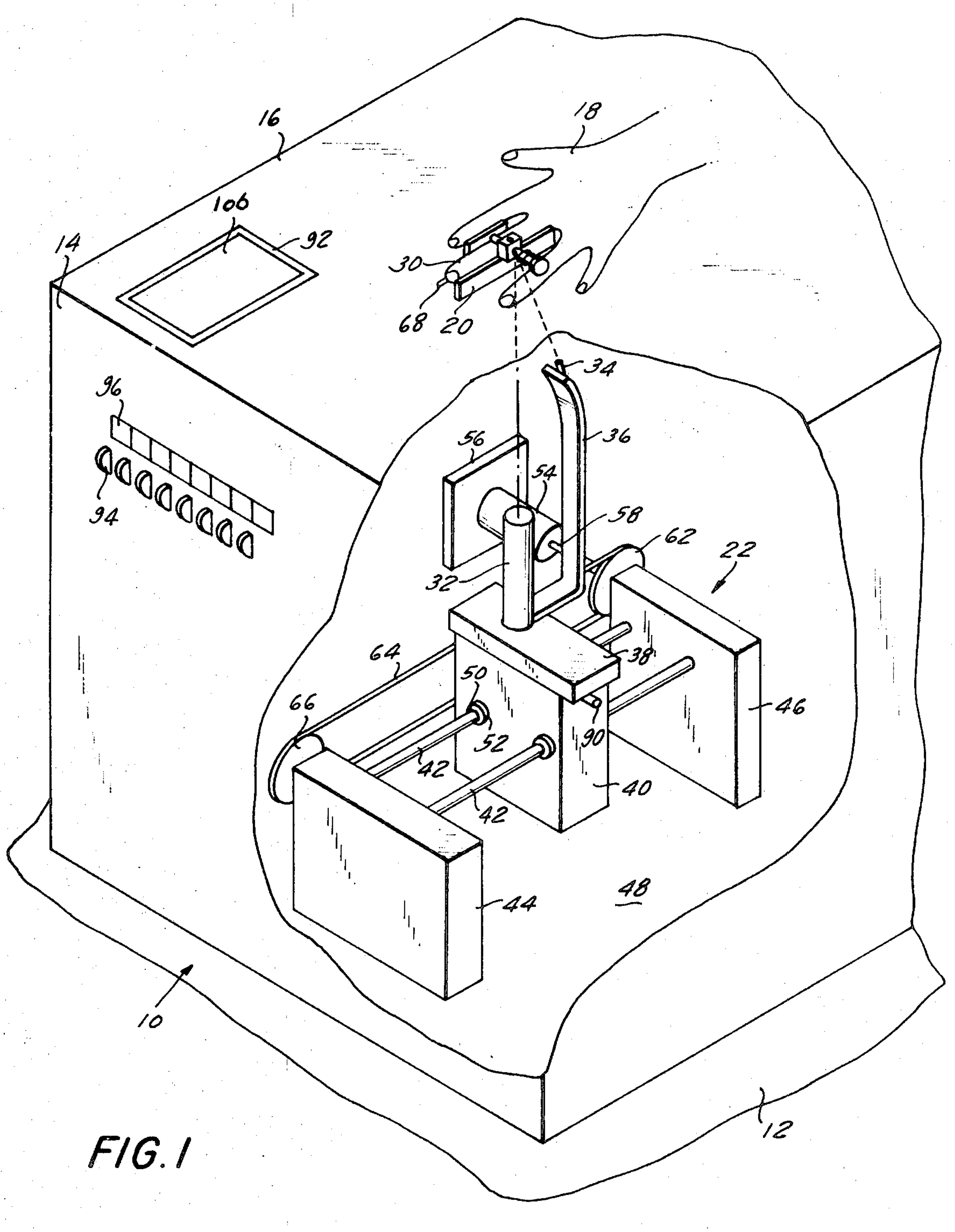
FIG. 1 is a perspective view, partly broken away, of a positive identification unit showing an individual's hand positioned on the hand support and a transducer within the unit.

With reference now to the drawings, and particularly FIG. 1, positive identification unit 10, which may be located at any place where identification or verification of the identity of an individual is to be made is shown supported on a suitable platform, for example a table 12. While the positive identification unit of the present invention will be described herein as utilizing the underside of a selected finger of the hand as a designated skin area for identification purposes, it is to be expressly understood that any other skin area of an individual such as the back of the hand along the finger, the palm of the hand or the like may also be used with equal facility. Thus, as disclosed herein, unit 10 includes an outer housing 14 having a top flat surface 16 upon which the individual whose identity is to be established or verified places his hand, indicated at 18. Mounted on the surface 16 is a hand-positioning guide 20, which will be described more fully hereinafter, to precisely align the individual's hand 18 relative to a transducer unit 22 within housing 14.

Figure 2:
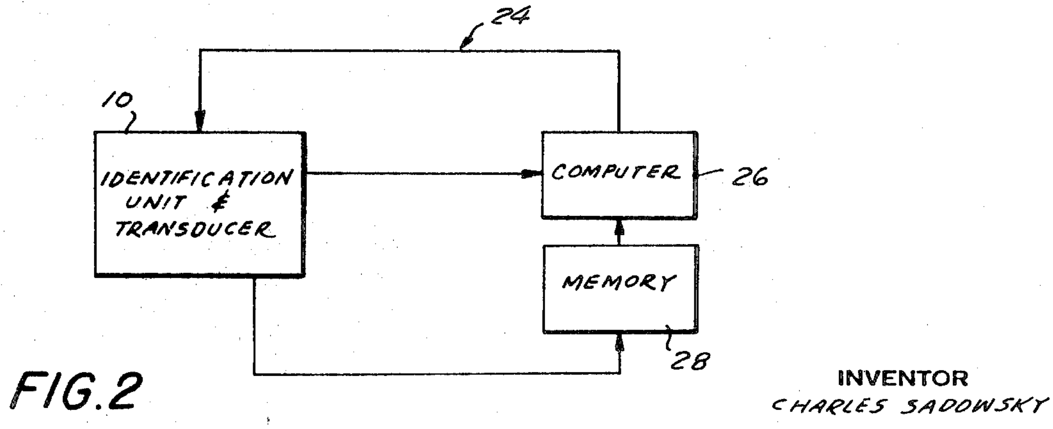
FIG. 2 is a schematic representation of a system for effecting identification for credit utilizing the positive identification unit of FIG. 1.

With reference now to FIG. 2 as well, unit 10 is shown operably connected in a system 24 for correlating and comparing electrical signals produced by transducer 22 in response to distinguishing features of a designated skin area of an individual with what should be corresponding electrical signals stored in a computer memory to determine whether the individual whose hand is on unit 10 is the same individual represented by the signals stored in the computer memory. System 24 includes an electronic transducer 22, a digital computer 26 having a comparator circuit therein and a memory or storage bank 28.

Where the positive identification unit of the present invention is used for the verification of an individual's identity, means are provided in unit 10 operably connected to the memory 28 so that a specific set of electrical representations characteristic of the individual whose identity is to be verified may be withdrawn from the memory 28 and sent to the computer 26. This can be effected by assigning the electrical representations in the memory an address or call number which, advantageously, may be the social security number, or other assigned number, of the individual whose identity is to be verified.

Where the unit is to be used to establish the identity of an individual, means are provided to activate a scan circuit in the computer to scan the sets of electrical representations stored in the computer memory in order to match a set of electrical representations stored in the computer memory which are characteristic of an individual whose identity is known to the set of electrical representations of the individual whose hand is on unit 10.

Thus, the feedback from computer 26 to unit 10 where an individual's identity is to be verified would be simply an indication that a correlation between the electrical representations transduced by transducer 22 and the electrical representations in memory 28 correlate thereby verifying the identity of the individual; and where the identity of an individual is to be established, the feedback to identification unit 10 would be an indication of the identity of the individual whose electrical representations have been selected from the computer memory as correlating to the electrical representations transduced by transducer 22.

It is to be appreciated that where the unit is to be used merely as a verification of the identity of an individual, for example in commercial applications such as credit verification or in security applications to determine if an individual is to be admitted to a security area, the degree of correlation need not be as refined because a comparison is being made between one individual and a particular set of stored electrical representations. Hence, a wider latitude in matching the skin characteristics is permissible while still obtaining a high degree of accuracy in verifying the individual's identity. However, where the identity of an individual is to be established, the electrical representations of the individual whose hand is placed on unit 10 must be compared with millions of stored electrical representations in order to provide a positive identification of the individual. Thus a more refined scan of the designated skin area must be made in order to determine the identity of an individual. While the apparatus of the present invention can be made to function with this degree of refinement, providing the apparatus with such a degree of refinement will require more complex and expensive equipment and would also require a highly sophisticated program for the computer in order to scan the great number of stored sets of representations and make a comparison. This would increase computer time needed and, hence, add greatly to the expense. Accordingly, it is preferable if the scan were made with a sufficient degree of refinement to match the electrical representations of the individual's hand on unit 10 so that the feedback of information from the computer would show a possible correlation and match with a limited number of stored sets, e.g. on the order of 50 to 100 sets of electrical representations. Once the computer has indicated that the identity of the individual is most probably one of 50 to 100 possible individuals, a standard fingerprint comparison can now be made between the individual and the fingerprints of the 50 to 100 individuals that the computer has indicated. This comparison can be made in a short time and, thus, the identity of the individual is accurately determined in an exceedingly short time by eliminating a manual and visual comparison of the fingerprints of the individual with a great mass of fingerprints.

Figures 3, 5:
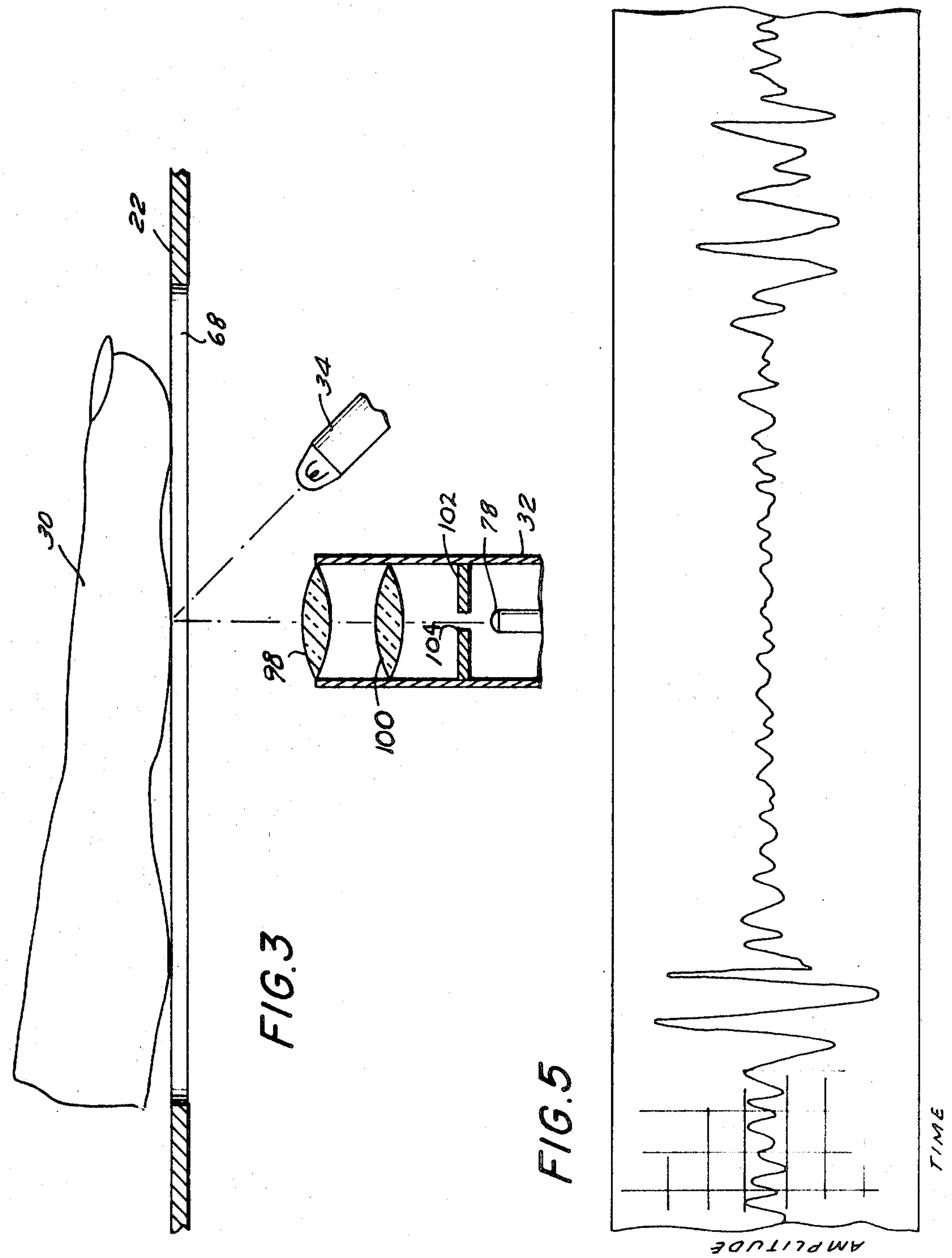
FIG. 3 is an elevational view showing somewhat schematically the relative position of the light source and photocell during a scan.
FIG. 5 is a representation of the transduced signals.

With reference now again to FIG. 1, the transducer 22 which is located within the unit 10, is adapted to optically scan a designated skin area of an individual, for example a finger which may be any finger or even the palm of the individual, but is preferably the middle finger 30, to detect light and dark areas representative of ridges and depressions along the designated skin area as well as the contrast of light to dark at the finger joints which are also specifically indigenous to an individual. The light and dark areas thus detected are transformed into a series of electrical representations which, if reproduced by a pen on a moving roll of paper responsive to the analog signals generated by transducer 22, have a characteristic as shown in FIG. 5. These signals are transmitted to computer 26 where they are converted by an analog-to-digital converter circuit in computer 26 to digital electrical signals and the computer then compares the electrical representations detected by transducer 22 with those delivered from memory 28 to determine, within a reasonable probability, whether there is a correlation.

The scan made by the transducer 22 is preferably a line scan along the length of the finger but may be a scan in any other pattern along the designated skin area having distinguishing ridges and valleys. By using a line scanner on a finger, it is possible to detect the ridges and valleys along the linear scan path as well as the difference in reflectivity resulting from skin tone variations at the joints between sections of the fingers and the identification thus made has been determined to be of sufficient exactitude for positive identification of an individual. As noted above, this identification may be made accurate to a very high degree or may be programmed within reasonable tolerance limits in order to maximize the cost effectiveness of the equipment and use of the associated data processing equipment.

With reference again to FIG. 1, unit 10 is shown partly broken away to show the transducer 22 located therein. Transducer 22 includes a photoduo-diode cell 32 oriented so that its longitudinal axis is perpendicular to top surface 16 of unit 10 and a light source 34 on one side of cell 32, preferably in the same plane as the linear scan, and positioned to direct a beam of light intersect the longitudinal axis of cell 32 at a point above the cell. The intersection of the light beam from source 34 and the axis of cell 32 produces a shadow effect during the transducer scan to optically ascertain the ridges and valleys of the designated skin area as will be more fully explained hereinbelow.

Light source 34 is fixed to bracket support 36 and both the bracket support 36 and cell 32 are mounted on a slide member 38 carried by a moving carriage block 40, which block is slidably disposed along a pair of guide rods 42. Guide rods 42 in turn are mounted in fixed upstanding support plates 44 and 46 rigidly secured to a base member 48. Carriage block 40 is provided with a pair of spaced transverse bores 50 within which are mounted guide bushings 52 which act as sliding bearing members for carriage block 40 on guide rod 42.

Movement of carriage block 40 along guide rods 42 is effected by a reversible synchronous motor 54 mounted on an upstanding support plate 56. The output shaft 58 of motor 54 is secured to a driver gear 62 which is rotatably mounted on support plate 46. An endless chain 64 is engaged by gear 62 and passes over an idler gear 66 rotatably mounted on support plate 44 and chain 64 is rigidly secured to carriage block 40 by a bracket (now shown). Hence, as motor 54 is actuated, chain 64 and carriage block 40 are moved along a reciprocating linear path to cause cell 32 and light source 34 to move along a linear scan path. Suitable limit switches (not shown) are also provided to limit the length of the scan and automatically reverse the motor 54. The limit switches are set so that during the critical segment of the scan, i.e., when cell 32 and light source 34 traverse the designated skin area, the speed of travel is constant and uniform so that accurate correlation between the transduced signal and the stored representations can be made. Also, since motor 54 is a synchronous motor, its speed of operation is fixed by the 60 cycle AC power supply standard throughout the country.

The beam of light from light source 34 is at an oblique angle to the vertical axis of cell 32 and is positioned so that the light is incident ton the designated skin area to be scanned. The surface 16 is provided with a suitable slot 68 therein (see FIG. 4) positioned so that the designated skin area is visible therethrough from within unit 10.

Thus, because of the angle of incidence of the light, when light shines upon the designated skin area any topographical irregularities, such as the ridges and valleys of a skin area, will result in light areas being illuminated at the ridges and dark areas, i.e., shadows, formed in the valleys or depressions. The photoelectric cell 32 adjacent to light source 34 receives the light transmitted back from the surface and produces a signal which is converted by transducer 22 into an analog signal shown graphically in FIG. 5. In this manner, the characteristics of the designated skin area are detected, transduced into electrical signals and sent to computer 26 for comparison.

With reference now to FIG. 3 as well, the middle finger 30 is shown positioned over slot 68 on top surface 16 with light source 34 and photocell 32 positioned therebelow. Light source 34, as noted above, is directed at an oblique angle with respect to the vertical axis of photocell 32 to be incident on the portion of finger 30 visible through slot 68, and hence, produces a shadow effect which illuminates the ridges and creates a shadow in the depressions of the characteristic skin configuration of finger 30. Photocell 32 is provided with an optical lens system including lenses 98 and 100 to focus the reflected image along the vertical axis of photocell 32. In addition, a screen 102 having a central aperture 104 therein is provided immediately above the light sensitive element 78 of photocell 32 so that only the reading of reflected light from a small spot along the vertical axis is read.

Figure 4:
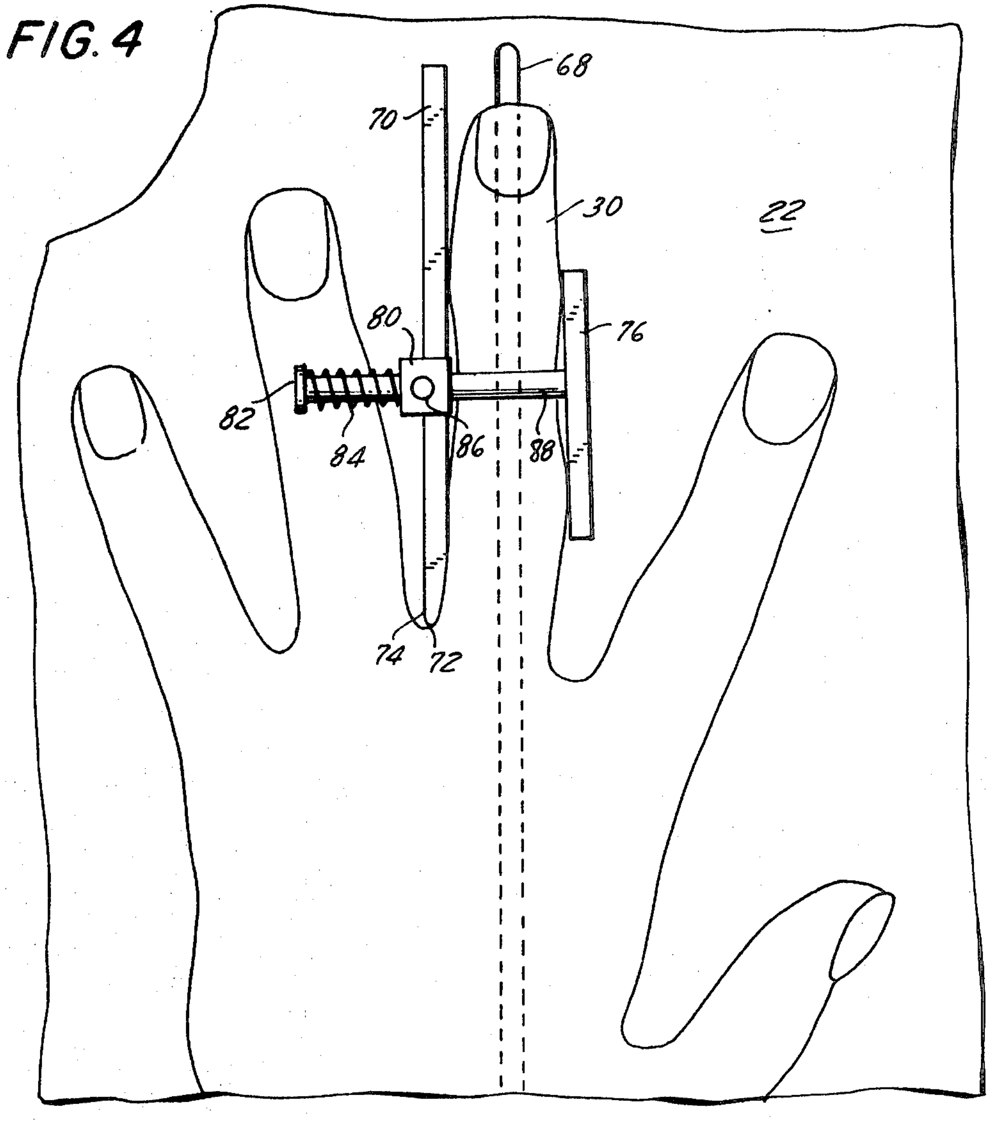
FIG. 4 is an enlarged top plan view of the positive identification unit showing a detail of the hand positioner.

FIg. 4 shows a top plan view of the unit 10 and the orientation on support surface 16, upon which the hand 18 of an individual is placed, of the positioning guide 20. As shown, slot 68 is located with respect to positioning guide 20 so that when the hand 18 of an individual is placed on surface 16, the positioning guide is adjacent the finger which is to be utilized for the scan. Thus, the individual will place the designated finger in this case the middle finger 30 but which may in fact be any of the fingers of the hand, firmly against the side of the positioning guide 20 thereby exposing the designated skin area to be scanned over the slot 68.

Of prime importance in positioning the hand for a scan by transducer 22 is the orientation of the hand so that the desired linear scan along the designated skin area is always reproduced. Hence, it is necessary to be able to position the hand repeatedly in the same orientation with respect to transducer 22 in order to have an effective and accurate correlation between the electrical signals produced by transducer 22 and the set of electrical signals stored in memory 28 used as the benchmark in establishing or verifying an individual's identity. Therefore, it is necessary to orient the designated skin area to prevent rotational variation in the hand position as well as variation in skew.

To eliminate rotational errors, the hand is placed on surface 16 with the fingers spread and the palm pressed against surface 16. The individual may press his hand down or an auxiliary member may be used. The middle finger of the hand is preferably selected because, with the hand placed on a flat surface and pressed thereagainst with the fingers spread, the middle finger is less subject to any tendency to rotate it with respect to the planar support. Hence, errors due to rotational misplacement of the selected linear scan line along this finger are obviated.

To preclude skew misorientation, positioning guide 20 is utilized comprising a flat plate member 70 rigidly secured to top surface 16 of unit 10 and spaced from slot 68 so that the transducer scan line, along the approximate mid line of finger 30, will be exposed within slot 68. Uniform repeatability of the placement of finger 30 is effected by placing the hand so that the "V" 72 formed between the index finger and the ring finger abuts the end 74 of plate member 70 and one side of finger 30 is pressed against the surface of plate member 70. For this purpose, a pressure plate 76 is provided to lie against the other side of finger 30. Pressure plate 76 is resiliently held by a connecting shaft 88 on one end thereof and is mounted for resilient movement with respect to plate 70 through block 80 fixed to the top of plate 70. The other end of shaft 88 includes a collar 82 and a tension spring 84 is fixed between collar 82 and block 80 to resiliently urge pressure plate 76 toward plate 70. Shaft 88 is pivotedly mounted in block 80 by a pivot mounting 86 to that pressure plate 76 can pivot slightly to accommodate irregularities in the contour of a finger while still pressing the finger 30 firmly against plate 70.

Once a particular finger and/or designated skin area is selected for purposes of identification, an initial scan is made of an individual to establish his identity and the electrical signals therefrom are recorded and stored in the memory bank 28. Thus, with the placement of positioning guide 20 with respect to slot 68 and the particular finger and/or designated skin area being standardized, whenever this individual places his hand in the same manner on another unit 10 to have his identity established or verified, the same portion of the finger or designated skin area will be exposed to the scan of transducer 22 and, hence, the signals sent by transducer 22 to the computer 26 will correlate with the representations stored in memory 28.

Thus, the positioning of the individual's hand and the scan speed is standardized so that a high degree of uniform repeatability of electrical representations characteristic of the designated skin area result. However, while the positioning guide assures significant accuracy in positioning the designated skin area in the proper relationship with respect to transducer 22, it can be appreciated that minor lateral deviations from the proper position may occur. Accordingly, it may be preferable to shift the light source and photocell laterally during a linear scan to obtain short parallel scan segments along the designated skin area as even a short linear scan along a finger is sufficient to make a positive identification.

As noted above, cell 32 and light source 34 are mounted on a slide member 38 on carriage block 40 with the slide member being adapted to move laterally with respect to block 40 in discrete increments.

Slide 38 may be made laterally movable with respect to carriage block 40 in any convenient manner, for example by a solenoid 90, fixed to block 40 and having its extendable member secured to slide 38 thereby to incrementally detent slide 38 laterally. Hence, during each linear scan, slide 38 is incrementally shifted laterally and the transduced signals from each linear scan segment are sent sequentially to the computer 26 for comparison with the representations from memory 28. If the signals from any one of the scan segments corresponds to any segment of the stored signals, then a positive identification is indicated.

While a mechanical system to laterally shift the photocell and light source has been described in order to insure that the correct linear scan is made, it is to be understood that other means for aligning the designated linear scan with respect to the photocell and light source may be used. Merely illustrative of such other means would be providing a correlation between the position of photocell 32 and light source 34 with respect to the alignment of pressure plate 76 and plate member 70. In other words, the linear scan of the photocell and light source can be made to coincide with a linear path substantially bisecting the distance between fixed plate member 70 and movable pressure plate 76.

When the apparatus of the present invention is to be used for the verification of the identity of an individual, for example in a commercial application such as verification of an individual's identity for credit or in a security application to verify that an individual should be admitted to a security area, it is merely necessary to ascertain whether the electrical representations obtained from a scan of the individual's designated skin area correlates or matches one specific set of electrical representations stored in computer memory 28 which are known to belong to a particular individual. Accordingly, it is necessary to retrieve from the computer memory a particular indicated set of electrical representations. As noted above, a particular address or call number in the computer may be programmed to correspond with an identification number such as a social security number or other suitable identifying numbers. Preferably an individual's social security number is used because each individual is assigned such a number and because of the universality of the social security number as a means of identification of an individual. Thus, unit 10 may be provided with suitable number scanning apparatus (not shown) which visually scans the identifying numerals from an appropriate identification card 106 placed on a card holder 92 on housing 14. Alternatively, if no card were to be utilized, or if the individual had misplaced his card and remembers his code number designation, appropriate number indicators such as wheels 94 may be provided which when rotated would sequentially indicate appropriate numerals visible through number indicators 96 and electronically record the appropriate call number or address for the computer memory.

Where the comparison of the transduced signals of an individual's designated skin area are to be made with a single set of stored signals known to belong to an individual whose identity is to be verified, a signal is sent to the appropriate address in the computer memory, the comparison is made and a simple "yest" or "no" signal is sent back to the transducing unit where verification of identity is being made to indicate whether a correlation has been made.

Where the comparison of the transduced signals of an individual's designated skin area are to be made with a large number of stored sets of electrical representations, e.g., to establish the identity of the individual, no address or call number will be sent to the computer memory, but instead, a computer search circuit is activated so that the computer searches the electrical representations stored in computer memory 28 in order to retrieve those sets of electrical representations which correlate and match, within a reasonable degree of certainty, the electrical representations transduced by transducer 22. The sets of electrical representations thus retrieved would have appropriate call numbers or addresses in the computer memory which would correspond to individuals whose identity is known. Thus, the standard fingerprint comparison can be made between the fingerprints of the individual to be identified and the fingerprints of those individuals who have been matched by comparison of the transduced signals. In this way, the manual and visual comparison of a great number of fingerprints is obviated and comparison need only be made with a relatively small number of fingerprint sets.

Thus, it is seen that the apparatus and method of the present invention provide a rapid and accurate means to establish or verify the identity of an individual by linearly scanning a designated skin area of an individual and transducing electrical representations characteristic of distinguishing characteristics along the designated skin area in order that these electrical representations may be correlated and matched to a corresponding set of electrical representations of a known individual stored in a computer memory.

What is claimed is:

1. In an apparatus for establishing the identity of an individual, including means for detecting distinguishing characteristics of a designated skin area of an individual, means for transducing said distinguishing characteristics into electrical signals representative of said distinguishing characteristics and means for comparing said transduced electrical signals with a set of stored electrical signals known to be representative of the same designated skin area of the individual whose identity is to be verified, the improvement comprising:

means associated with said transducing means to positively orient said designated skin area with a high degree of accuracy repeatedly to the same relative position within a plane parallel to and coincident with said transducing means and to minimize rotational movement of said designated skin area with respect to the proper alignment thereof within said fixed planar orientation thereby to repeatedly expose the same portion of said designated skin area corresponding to the characteristics of said stored electrical signals to said transducing means;

said designated skin area being an area on an individual's hand;

said means to positively orient said designated skin area includes a flat planar surface upon which an individual may place his hand palm down whereby said flat planar surface cooperates with said palm to minimize relative rotation of said designated skin area on said hand with and disposed to said planar surface, and a fixed positioning guide member extending from said flat planar surface to cooperate with a predetermined portion of said individual's hand thereby the planar positively orient said predetermined portion of said individual's hand and fix the relative position of said hand on said planar surface.

2. Apparatus as defined in claim 1 wherein said transducing means includes means to scan said designated skin area along a linear path and means to detect distinguishing characteristics of said designated skin area along said linear scan path.

3. Apparatus as defined in claim 2 wherein said means to detect said distinguishing characteristics includes a light source and a photoelectric cell, said cell being oriented along a vertical axis coincident with said linear scan path and said light source being spaced from said cell and disposed at an angle with respect to said vertical axis to direct a beam of light which intersects said vertical axis at a point in a plane coincident with the planar orientation of said designated skin area thereby to illuminate said ridges of said designated skin area and cause the formation of shadows in said valleys of said designated skin area whereby the image of said illuminated and shadowed areas are detected by said cell and are transduced by said transducing means into electrical signals representative of the distinguishing characteristics of said designated skin area.

4. Apparatus as defined in claim 2 wherein said transducing means further includes means to incrementally laterally displace said transducing means during each linear scan thereby to provide a plurality of discrete linear scan segments along said designated skin area with each successive scan segment being incrementally laterally spaced from the preceding scan segment thereby to eliminate errors due to slight lateral displacement of said designated skin area.

5. Apparatus as defined in claim 1 wherein said flat planar surface includes a longitudinal slot therein laterally spaced from said positioning guide member and oriented over said transducing means whereby when said individual places his hand on said planar surface against said positioning guide said designated skin area is exposed to said transducing means through said slot.

6. Apparatus as defined in claim 5 wherein said designated skin area is a skin area along a linear path on the palm side of a selected finger of said individual's hand and said positioning guide includes a flat plate member extending from said planar surface and adapted to fit between said selected finger and its next adjacent one with one side of said selected finger being pressed against the longitudinal face of said plate member thereby to orient said designated skin area on said finger within said slot.

7. Apparatus as defined in claim 6 wherein said designated skin area is a skin area along a linear path along the length of the middle finger of said individual's hand and said positioning guide further includes a resiliently urged pressure plate member adapted to engage the other side of said middle finger thereby to maintain said finger firmly against said plate member.

8. Apparatus as defined in claim 7 wherein said pressure plate member is pivotally secured to said flat plate member thereby to accommodate variations in the contour of a finger placed in said positioning guide to insure proper orientation of the designated linear scan on said finger with respect to said transducer.

9. A method for determining the identity of an individual by utilizing the distinguishing characteristics of a designated skin area along a linear path on the underside of a selected finger of an individual's hand comprising, fixing said individual's hand in a predetermined orientation with respect to a transducing apparatus, said step of fixing said individual's hand comprising placing said hand palm side down on a flat planar surface with the fingers of the hand extended thereby to preclude relative rotation of the selected finger of said hand and fixing the selected finger against a position plate extending from said planar surface to preclude misalignment of said selected finger, taking an initial linear scan with a photoelectric transducing means along said designated linear path and converting the response to said transducing into a set of electrical signals representative of said distinguishing characteristics, storing said set of electrical signals in a memory bank of a data processing system, repositioning said individual's hand in said predetermined orientation when saiindividual's identity is to be determined, taking a substantially identical linear scan of said individual's designated skin area, and transducing the impressions representative of the distinguishing characteristics of said individual into a set of electrical signals representative of said characteristics and comparing said second set of electrical signals with said first set stored in said memory bank in a computer thereby to determine the identity of said individual.

10. The method as defined in claim 9 wherein said linear scan is taken along the length of said selected finger of said hand and the distinguishing characteristics to establish the individual's identity include the ridges and valleys along the linear scan path of said finger as well as the difference in reflectivity from skin tone variations along said scan path.

UNITED STATES PATENT OFFICE

CERTIFICATE OF CORRECTION

Patent No. 3,614,737 Dated October 19, 1971

Inventor(s) Charles Sadowsky

It is certified that error appears in the above-identified patent and that said Letters Patent are hereby corrected as shown below:

Claim 1, line 25 - "and disposed" should be -- respect --

Claim 1, line 29 - "the planar" should be -- to --

Claim 9, line 18 - "saiindividual's" should be -- said individual's --

Signed and sealed this 16th day of May 1972.

(SEAL)
Attest:

EDWARD M.FLETCHER,JR.
Attesting Officer

ROBERT GOTTSCHALK
Commissioner of Patents